No. 755,901. PATENTED MAR. 29, 1904.
R. MALLY.
BEERWORT DISTRIBUTER.
APPLICATION FILED JULY 31, 1903.
NO MODEL.

Witnesses:
C. S. Noble
C. Heymann

Inventor
Roman Mally
by B. Singer Att'y

No. 755,901.

Patented March 29, 1904.

UNITED STATES PATENT OFFICE.

ROMAN MALLY, OF VIENNA, AUSTRIA-HUNGARY.

BEERWORT-DISTRIBUTER.

SPECIFICATION forming part of Letters Patent No. 755,901, dated March 29, 1904.

Application filed July 31, 1903. Serial No. 167,714. (No model.)

*To all whom it may concern:*

Be it known that I, ROMAN MALLY, a subject of the Emperor of Austria-Hungary, residing at 9 Felsgasse, Vienna XI, Austria-Hungary, have invented a new and useful Improvement in Beerwort-Distributers, of which the following is a specification.

This invention relates to means for distributing beerwort from any regular source, such as a surface-cooler, to a plurality of vats or tuns, so that the beerwort flowing into these tuns will all be of equal temperature and of equal saccharinity. The vats or tuns into which the beerwort is introduced are the receptacles wherein it will subsequently be allowed to work to form beer.

The objects of my invention are to provide means whereby the beerwort may be equally distributed into a plurality of tuns, means whereby a desired amount of water may be mixed with the beerwort, and means whereby the temperature of the beerwort or mixture may be determined at all times. I attain these objects by means of the device which is shown in the accompanying drawings, in which—

Figure 1:
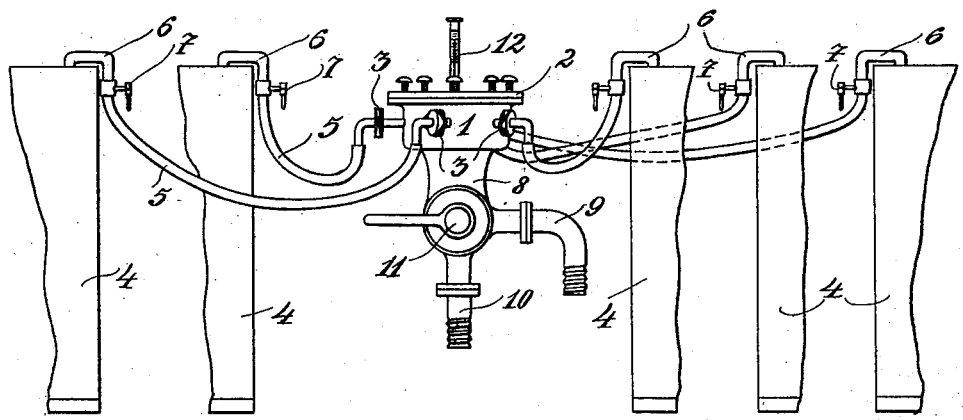
Figure 2:
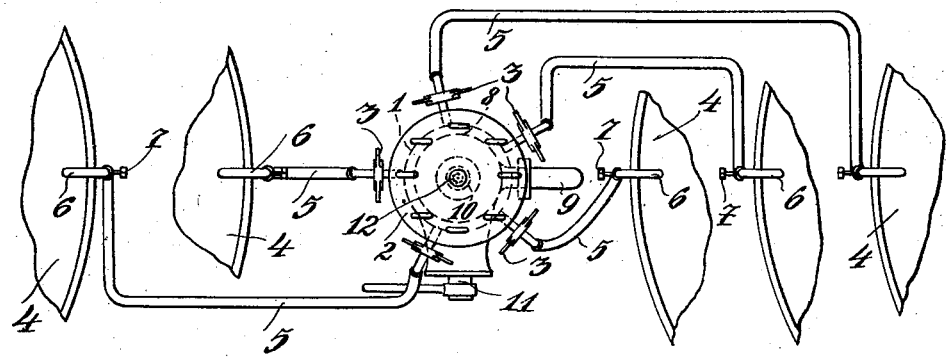

Figure 1 is a view in elevation of an apparatus embodying this invention. Fig. 2 is a plan view of the apparatus shown in Fig. 1.

As shown in the drawings, 1 represents a distributing vessel which is provided with a hermetically-sealed cover 2. Projecting laterally from the sides of the vessel 1 and communicating with the interior thereof are pipe connections 3, to which are attached suitable lengths of flexible hose 5. The ends of the hose 5 are provided with bent discharge-nozzles 6, which are adapted to be hooked over the sides of the tuns 4. Each of these discharge-nozzles are provided with a valve 7 for regulating or cutting off the discharge therethrough.

The vessel 1 is provided with an inlet-pipe 8, which is preferably formed integrally therewith. The pipe 8 is in connection with a water-supply pipe 9 and a pipe 10 for the beerwort. The connection between the pipes 8, 9, and 10 is regulated by means of a three-way valve 11, whereby the pipes 9 and 10 may be alternately opened or closed or the supply entering through be regulated as desired.

A thermometer 12 is arranged in the cover 2 of the distributer in order to indicate the temperature of the liquid therein.

The operation of this device is as follows: If the beerwort is drawn from the cooler, it is conducted through any suitable connection to the inlet 10, which is opened and the water-supply 9 cut off. The beerwort flows through the inlet 10 into the distributer 1 and from here flows out equally through all the pipes into the tuns 4. The supply for any individual tun is regulated by means of the valve 7 or may be entirely cut off. If it is desired, the inlet 9 may be partially opened and water allowed to enter with the beerwort to become mixed therewith in the vessel 1.

By means of this apparatus it is readily apparent that the beerwort may be supplied at a uniform temperature to a large number of tuns simultaneously, and the degree of saccharinity will be equal throughout the various tuns.

I am aware that various modifications of this apparatus may be made without departing from the spirit of this invention, which I do not wish to limit to the exact details herein shown and described; but

What I claim, and desire to secure by Letters Patent, is—

In a beerwort-distributer, the combination of a distributing-receptacle, a hermetically-closed cover for said receptacle, hose connections with said receptacle, hose leading from said connections, discharge-nozzles at the ends of said hose, valves in said nozzles, a supply-pipe connecting with said vessel, a water-supply pipe and a beerwort-supply pipe connecting with said first-named pipe, and a three-way valve whereby the latter pipes may be alternately opened and closed.

In witness whereof I have hereunto signed my name, this 11th day of July, 1903, in the presence of two subscribing witnesses.

ROMAN MALLY.

Witnesses:
  ALVESTO S. HOGUE,
  FIGGUAZ KUIRFCHNACKE.